Patented May 26, 1953

2,639,617

UNITED STATES PATENT OFFICE 2,639,617

METHOD FOR DETERMINING INSECT PARTS IN CEREAL FLOUR

Roger A. Larkin, Peoria, Ill., assignor to the United States of America as represented by the Secretary of Agriculture No Drawing. Application July 3, 1952,
Serial No. 297,189

6 Claims. (Cl. 73—432)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a method for determining the presence of insect parts in cereal flour. It relates particularly to a method for detecting and determining insect and larval fragments in cereal flour or in similar comminuted compositions by a simple differential color technique. The method is more accurate and definitive than prior methods for evaluating flours.

Comminuted insect fragments are a frequent contaminant of cereal flours, especially dry-milled corn, wheat, and oat flours. Hence, these materials are contaminants in the various food compositions containing such flours as ingredients. Evaluation of such flours and compositions has long been a problem of considerable economical significance. Prior methods have been suggested, but all such have one or more major disadvantages. For example, prior tests frequently require complicated and tedious techniques; they are not usually definitive; and moreover, they do not provide results that are wholly reliable and reproducible.

I have discovered that insect and larval fragments, when separated from the starch and cereal protein constituents of cereal flours, possess a distinctive color, imparted when viewed in a solution of Crystal Violet dye. I have discovered moreover that such fragments are readily distinguishable from other particles normally present in cereal flours, such as bran particles and small particles of cell wall material.

Utilizing my discoveries, I have invented a method for determining accurately the insect and larval fragments content of cereal flours. In general, my method comprises removing the starch and cereal protein components from a cereal flour, as for example by dispersion in strong alkali, separating the dispersion from the residue, and then treating the residue with Crystal Violet. Under these conditions the fragments of insects and larvae are a distinctive bright red, and the insect fragment content of the flour sample may be determined visually, i. e. by estimating the relative proportion, by counting the fragments, or any other visual or optical method as desired.

My invention possesses several advantages over prior methods using stains. For example, in addition, it has advantages over methods in common use, in that it does not depend upon a morphological analysis. This advantage permits the recognition of the smaller fragments which are extremely difficult to identify by their morphological characteristics. These small fragments have heretofore been easily confused with small fragments of the grain cell walls. Pieces of thorax, for example, which have only three or four pits and are very difficult to identify by their morphology, are easily differentiated by the method of this invention. Some of the smaller fragments do not have enough morphological characteristics for identification, but are sharply differentiated by their color in my Crystal Violet solution.

Since the insect and larval fragments are easily identified by color alone, highly trained personnel are not required to carry out the test. Workers using this method for the first time check each other to within one or two fragments.

My invention is carried out in detail in the following manner. The initial step of removing the starch and cereal protein components may be accomplished by a variety of methods with which the art is familiar, as for example, by alkaline or acid treatment or by enzyme hydrolysis. For reasons of convenience, I prefer alkaline treatment, and my invention will be illustrated by this method, it being understood that it is not limited thereto.

The procedure, which can be easily completed in twenty-five minutes, consists essentially of dispersing the starch and cereal protein with alkali, filtering through a screen, and immersing the material collected on the screen in Crystal Violet solution for viewing.

A sample of flour, which may be any convenient quantity as, for example, fifteen grams, is suspended in ethanol. The ethanol suspension is then diluted with approximately ten volumes of water and sufficient strong alkali solution is added to disperse the starch and protein. The alkali is then partially neutralized with acid and the dispersion separated from the residue by filtration. After filtration, the residue is transferred to a suitable container and covered with Crystal Violet solution. After standing in the solution for about 10–20 minutes, the residue may then be examined to observe the insect fragments.

The insect fragments appear orange-red, while the bran particles in the residue are stained deep violet. Larval fragments do not appear quite as bright as the adult insect fragments. The orange-red coloration appears to be an absorption or other phenomenon rather than a true staining reaction, since it disappears when the fragments are removed from the dye solution. The observations, therefore, must be made while the residue is immersed in the solution. The differential coloration is characteristic of the exoskeleton of either larva or adult insects. The internal parts are stained violet, the same color as the bran particles.

It is important that the steps of dispersion with alkali and subsequent identification be carried out with a minimum lapse of time because the alkali treatment, if unduly prolonged, tends to cause the bran particles to appear red instead of violet after staining, thus reducing the sharp differentiation in color. The alkali used at the dispersion step may be any suitable alkali as, for example, sodium or potassium hydroxide, and the kind and amount of acid used may vary somewhat. Any mineral acid is suitable. It is desirable, of course, that the alkali and acid combination employed does not result in the formation of an insoluble salt.

Sufficient acid should be added to reduce the alkalinity below that required for the dispersion step. However, the amount of acid added should be limited so that the final pH of the solution is still above 7.

The concentration of the dye solution should be within the range of 0.020 to 0.030 percent. This concentration is sufficient to accomplish the necessary staining, and sufficiently dilute to permit easy observation of the stained particles. The following specific example illustrates the invention.

Fifteen-gram samples of wheat flour were suspended in 55 ml. portions of 95 percent ethanol, and to each was added 500 ml. of distilled water. To each of the suspensions was added 500 ml. of 5 per cent (1.25 N) sodium hydroxide. Each was then diluted with an equal volume of distilled water, and the mixtures were stirred well.

To each of the above mixtures, which now consisted of alkaline dispersions of the starch and protein together with an insoluble portion, was added 40 ml. of 12 N hydrochloric acid. The dispersions were then separated from the insoluble material by filtration through a fritted glass funnel provided with a tight-fitting disc of 200-mesh wire screen. After filtration, the wire disc bearing the insoluble matter was placed in a petri dish containing sufficient 0.025 percent aqueous Crystal Violet solution to cover the screen, and the solutions were permitted to stand for 15 minutes.

The petri dishes and contents were then placed under a dissecting microscope and observed, using transmitted light from a disc lamp and a concave substage mirror.

An average of 41.3 insect fragments was found for the 15 gram samples, equivalent to 137 fragments in a 50 gram sample. A National Check Sample Committee, of the American Association of Cereal Chemists, report on the same flour in 50 gram samples gave an average of 23.8 insect and larval fragments.

The higher fragment count obtained in the foregoing example compared with the National Check Sample Committee report may be due in part to a greater recovery of small fragments accomplished by using a 200-mesh screen. A 100-mesh screen naturally would not retain fragments smaller than about 150 microns in diameter while a 200-mesh screen would retain fragments as small as 74-microns in diameter. The latter fragments are easily identified by my novel method. In fact, the refinement of my method seems dependent only upon the mesh size of the screen selected.

I claim:

1. A method for determining contaminants in cereal flours comprising removing the starch and cereal protein from a given sample of flour and treating the separated residual matter with a 0.020–0.030 percent aqueous solution of Crystal Violet whereby to color insect part contaminants in a differential manner and subsequently determining the degree of said contamination by visual observation.

2. A method for determining contaminants in cereal flours which comprises dispersing the starch and cereal protein from a given sample of flour in alkali, reducing the alkalinity of the dispersion below that of dispersibility, but above pH 7, by the addition of acid separating the dispersed phase from the residue and treating the separated residue with a 0.020–0.030 percent aqueous solution of Crystal Violet whereby to color insect part contaminants in a differential manner and subsequently determining the degree of said contamination by visual observation.

3. The method comprising suspending a known quantity of cereal flour in aqueous alcohol, adding alkali in sufficient quantity to disperse the starch and cereal protein of the flour, adding acid to reduce the alkalinity below that necessary to effect dispersion but not below the point of neutrality, separating the dispersion from the insoluble residue and immersing the residual matter in 0.020–0.030 aqueous Crystal Violet solution and subsequently determining the degree of insect part contaminant present by visual observation.

4. The method of claim 1 wherein the step of alkalinity reduction follows substantially immediately the step of effecting dispersion of the starch and protein.

5. The method of claim 2 in which the step of separating the dispersed phase from the residue is carried out by means of a screen.

6. The method of rendering insect parts visually distinguishable from components in cereal grains which comprises subjecting a mixture of said parts and said components to the action of a 0.020–0.030 percent aqueous solution of Crystal Violet dye.

ROGER A. LARKIN.

References Cited in the file of this patent

UNITED STATES PATENTS

| Number | Name | Date |
|---|---|---|
| 2,525,789 | Frankenfield | Oct. 17, 1950 |